(12) United States Patent
Chauvin et al.

(10) Patent No.: US 7,497,324 B2
(45) Date of Patent: Mar. 3, 2009

(54) CONVEYOR SYSTEM FOR TWO OR MORE TROUGHS (75) Inventors: Fred T. Chauvin, O'Fallon, MO (US); Michael Didion, St. Peters, MO (US)

(73) Assignee: Conveyor Dynamics Corporation, St. Peters, MO (US)

( * ) Notice: Subject to any disclaimer, the term of this patent is extended or adjusted under 35 U.S.C. 154(b) by 49 days.

(21) Appl. No.: 11/325,744

(22) Filed: Jan. 5, 2006

(65) Prior Publication Data

US 2006/0157324 A1    Jul. 20, 2006

Related U.S. Application Data (60) Provisional application No. 60/645,221, filed on Jan. 20, 2005.

(51) Int. Cl.
*B65G 27/10*    (2006.01)
*B65G 27/00*    (2006.01)
*B65G 27/30*    (2006.01)
*B65G 27/32*    (2006.01)

(52) U.S. Cl. ............... 198/753; 198/750.8; 198/735.6; 198/760; 198/763

(58) Field of Classification Search .............. 198/750.8, 198/753, 760, 763, 735.6, 750, 758, 766, 198/752.1
See application file for complete search history.

(56) References Cited

U.S. PATENT DOCUMENTS 1,930,844 A    10/1933 Ruddell
2,299,005 A    10/1942 Bigelow
2,664,995 A *  1/1954  Renner .................... 198/760
3,552,545 A *  1/1971  Hartman .................. 198/533
3,581,871 A *  6/1971  Forman .................... 222/55
3,677,395 A    7/1972  Musschoot
3,712,459 A    1/1973  Musschoot et al.
3,750,866 A    8/1973  Musschoot
4,133,424 A    1/1979  Sabes (Continued)

FOREIGN PATENT DOCUMENTS

DE    3834576 A1 *    4/1990

*Primary Examiner*—Kavel P Singh
(74) *Attorney, Agent, or Firm*—Paul M. Denk (57) ABSTRACT A right angle conveyor has a first trough and a second trough to move product by reciprocating motion with the second trough at an angle to the first trough. Rocker arms and corresponding reactor springs joined to a chassis form the first and second troughs. The first trough has a motor upon the chassis, eccentric cam, and a linkage to induce reciprocating motion into the conveyor. To induce reciprocation, the first trough has a first bracket connected to a yoke upon a trunnion joined to the chassis, a yoke connected to a slave drive spring bracket, a slave spring connected to the slave drive spring bracket and to a second bracket, the slave spring connected to a second bracket beneath the second trough. The yoke has three pinned connections to permit rotation. Thus, reciprocal movement of the first trough transmits through the first bracket to the first pin, rotates the yoke upon the trunnion, moves the second pin, transmits movement to the slave drive spring bracket and the slave spring and then to the second bracket, thus moving product upon the second trough perpendicular to the first trough. In an alternate embodiment, the yoke has ball and socket connections and a trunnion upon a pivoting base so the second trough moves at any angle to the first trough.

6 Claims, 6 Drawing Sheets

U.S. PATENT DOCUMENTS

| | | | | |
|---|---|---|---|---|
| 4,152,255 | A | 5/1979 | Musschoot | |
| 4,428,476 | A | 1/1984 | Kraus et al. | |
| 4,611,709 | A | 9/1986 | Kraus et al. | |
| 4,624,370 | A * | 11/1986 | Danner et al. | 209/631 |
| 4,715,950 | A | 12/1987 | Danner et al. | |
| 4,844,235 | A | 7/1989 | Sherman | |
| 4,844,236 | A | 7/1989 | Kraus | |
| 4,979,608 | A | 12/1990 | Mikata et al. | |
| 5,037,536 | A * | 8/1991 | Koch et al. | 209/325 |
| 5,056,652 | A | 10/1991 | Kraus et al. | |
| 5,094,342 | A | 3/1992 | Kraus et al. | |
| 5,131,525 | A | 7/1992 | Musschoot | |
| 5,178,259 | A | 1/1993 | Musschoot | |
| 5,512,008 | A | 4/1996 | Musschoot | |
| 5,591,074 | A | 1/1997 | Musschoot | |
| 5,660,265 | A * | 8/1997 | Kampf | 198/609 |
| 5,669,711 | A | 9/1997 | Spence et al. | |
| 5,713,457 | A | 2/1998 | Musschoot | |
| 5,850,906 | A | 12/1998 | Dean | |
| 5,924,473 | A | 7/1999 | Musschoot | |
| 5,934,446 | A | 8/1999 | Thomson | |
| 5,967,222 | A | 10/1999 | Musschoot et al. | |
| 6,000,644 | A | 12/1999 | Musschoot | |
| 6,029,796 | A | 2/2000 | Musschoot | |
| 6,079,548 | A | 6/2000 | Svijkovsky et al. | |
| 6,112,883 | A | 9/2000 | Kraus et al. | |
| 6,155,404 | A | 12/2000 | Musschoot | |
| 6,237,749 | B1 | 5/2001 | Musschoot et al. | |
| 6,782,995 | B2 * | 8/2004 | Didion et al. | 198/750.8 |

\* cited by examiner

CONVEYOR SYSTEM FOR TWO OR MORE TROUGHS

CROSS REFERENCE TO REALTED APPLICATION

This non provisional patent application claims priority to the provisional patent application having Ser. No. 60/645,221, which was filed on Jan. 20, 2005.

BACKGROUND OF THE INVENTION

The yoke between conveyors at an angle relates to a two way vibratory conveyor in general and more specifically to diverting particulate matter from the initial flow direction. Initially, a yoke can be used for inline conveyors moving particulate matter or product. The yoke connects two conveyors and transmits motion from the first conveyor to the second conveyor, moving product upon the conveyors. A unique aspect of the present yoke between conveyors is diverting particulate matter from zero through ninety degrees from the initial direction of flow, and beyond.

Vibratory conveying equipment typically has a bed or trough along which particulate matter or product, such as pellets and gravel, passes. A trough mounts above a base upon a plurality of rocker arms and reactor springs. A drive with an eccentric cam induces vibratory motion in the trough. The troughs have large widths and lengths to handle volumes of product. Vibration of the troughs and movement of product through the trough cause large forces. Rocker arms stabilize the troughs and prevent lateral motion so that a trough has substantially limited movement: parallel to the longitudinal axis of the trough.

Manufacturing floor layouts and bulk material handling plans from time to time call for a diversion of product flow at a substantial angle, such as at a corner of a building or other obstacle. The prior art uses two separate troughs arranged at the desired angle with appurtenant motors and linkages. Motors on two troughs require synchronization to maintain product flow. Conveyor owners and operators have higher operating and maintenance costs and seek a single motor solution for conveyors at an angle.

SUMMARY OF THE INVENTION

An angled conveyor begins with at least one trough or conveying surface, mounted on a base and a drive that reciprocally moves the troughs. A single motor drives two troughs generally zero or greater degrees apart, preferably ninety degrees apart. The drive includes a single motor, an eccentric shaft rotationally driven by the motor and which extends generally perpendicular to the path of the reciprocal motion of the first trough. A cam connects to one end of the eccentric shaft and at the other end to the first trough. A yoke connects the first trough to the generally perpendicular second trough. The first trough has reciprocating motion to advance product forward and towards the second trough. The second trough has reciprocating motion out of phase with the first trough to maintain product motion but at a different angle.

In operation, the eccentric shaft induces reciprocal motion in the cam, which then imparts reciprocal motion in the first trough. The reciprocal motion of the first trough induces reciprocal motion in the second trough via the yoke. The yoke has a pinned first bracket and an opposite pinned slave drive bracket joined at a trunnion. The first bracket connects to the first trough, the slave drive bracket connects to the second trough, and the yoke itself pivotally mounts to the chassis of the first trough. The slave drive bracket is oriented generally ninety degrees from the first bracket. So when an operator views the first trough, the second trough is to the side of the operator. As the first trough moves the first bracket left to right, the yoke rotates upon the trunnion, the slave drive bracket moves up and down, and the second trough moves forward and backward with product traveling from the first trough to the second trough without interruption. And, the second trough moves at a substantial angle to the first trough.

DESCRIPTION OF THE PREFERRED EMBODIMENT

The present art overcomes the prior art limitations by providing a yoke and adjacent connections to translate motion from a first conveyor or trough to a second trough at an angle to the first trough. A trough may have a variety of shapes and finishes to transport various products. For example, a trough with a flat bottom and straight walls with lips transports dry, granular material like gravel or pellets. Another example includes a trough with a rounded bottom that transports damp or nearly liquid materials such as slurry. A third example has ridges formed into the bottom of a trough, directing product in one direction and minimizing backflow. In the preferred embodiment, the first trough and the second trough have a generally rectangular cross section with an open top. Alternatively, the first trough and the second trough have a rounded cross section. In a further alternate embodiment, the first trough and the second trough have a V shaped cross section.

Figure 1:
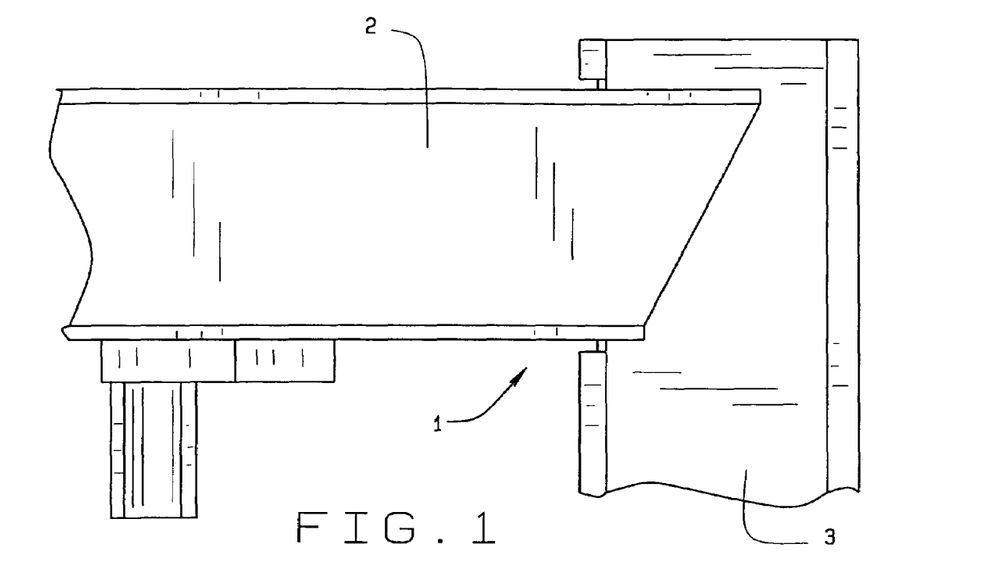
FIG. 1 shows a plan view of one trough at an angle to a second trough with the preferred embodiment of the yoke between conveyors beneath and constructed in accordance with the principles of the present invention.

Turning to FIG. 1, material handlers move bulk product along production lines. Due to site or facility conditions, production lines encounter turns. In the present invention 1, a second trough 3 diverts from a first trough 2 at a ninety degree angle herein shown in plan view. Additionally other angles or inline movement between consecutive troughs 2, 3 or conveyors can be reached using this invention. The first trough 2 ends in a miter that begins the turn of the product from the first 2 to the second troughs 3. Then in FIG. 2, material handlers seek to move product through a turn in the production line without interruption. The first trough 2 has a higher elevation than the second trough 3 to permit product to fall by gravity into the second trough 3. The first trough 2 undergoes reciprocal motion along its longitudinal axis generated by a common motor 7, cam, and linkage 9 such as that in U.S. Pat. No.

Figure 2:
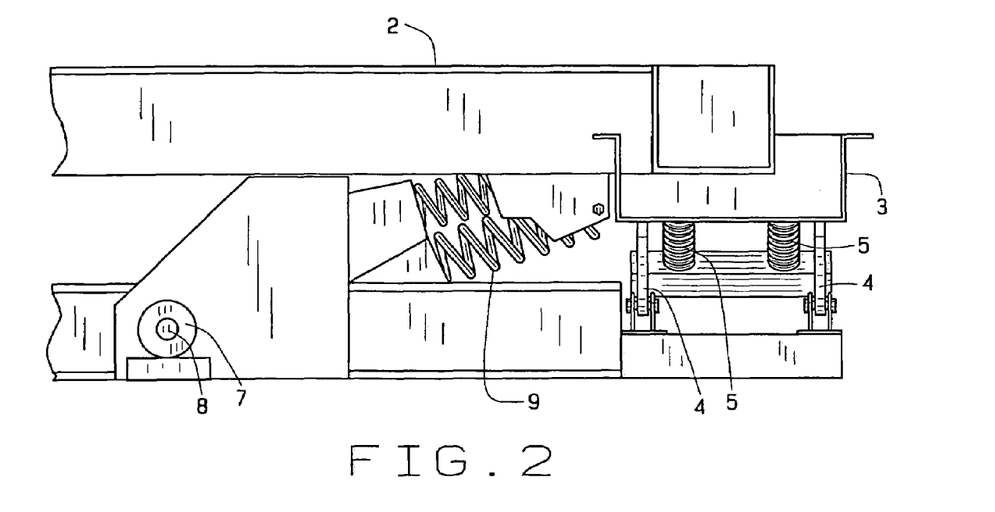
FIG. 2 shows a side view centered on the first trough looking lengthwise down the second trough of the preferred embodiment of the yoke between conveyors.

6,782,995 of the same assignee. Essentially, a trough rests upon two parallel and mutually offset gangs of reactor arms 4 and reactor springs 5. The motor 7 rotates the cam 8 that generates an intermittent force applied to the linkage 9. The linkage 9 applies and removes the force to reciprocate the trough 2. The reactor arms 4 support a fully loaded trough 2,3 and the reactor springs 5 return a fully loaded trough to a rest position for the cam 8 to induce another force. As the cycle repeats, product moves along from the first trough 2 towards the second trough 3.

Figure 3:
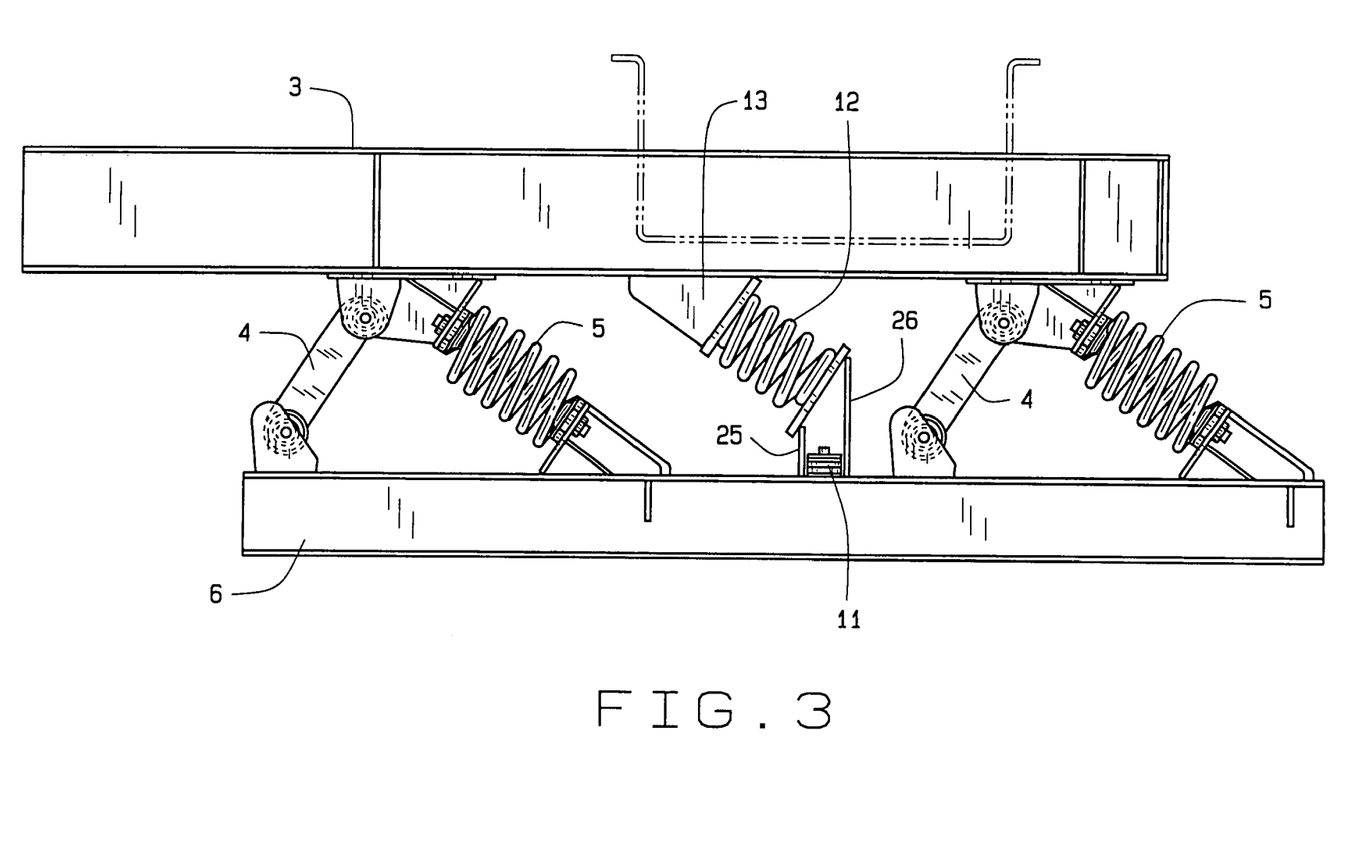
FIG. 3 shows a side view of the second trough the yoke between conveyors within the chassis of the second trough.

With the present invention assembled, FIG. 3 shows a side view of the second trough 3. The second trough 3 rests upon rocker arms 4 joined to reactor springs 5 at an apex. The rocker arms 4 and reactor springs 5 attach to the chassis 6 of the second trough 3. Centered beneath the second trough 3 inside of the rocker arm 4 closest to the first trough 2, a second bracket 13 joins to the second trough 3. The second bracket 13 has two generally triangular shaped plates 34, parallel and mutually spaced apart. The longest side of the plates 34 joins to the underside of the second trough 3. Upon the side of the plates 34 closest to the rocker arms 4, a cross plate 35 joins the two triangular plates 34. The cross plate 35 has a generally rectangular shape that connects with a slave drive spring 12. The slave drive spring 12 connects with the slave drive spring bracket 11. The slave drive spring bracket 11 operates within the chassis 6 of the second trough 3. This FIG does not fully show the slave drive spring bracket 11. The slave spring 12 connects with a spring plate 27 of generally rectangular shape. The spring plate 27 joins two other plates 25, 26, parallel and mutually spaced apart, forming an inverted U shape.

Figure 4:
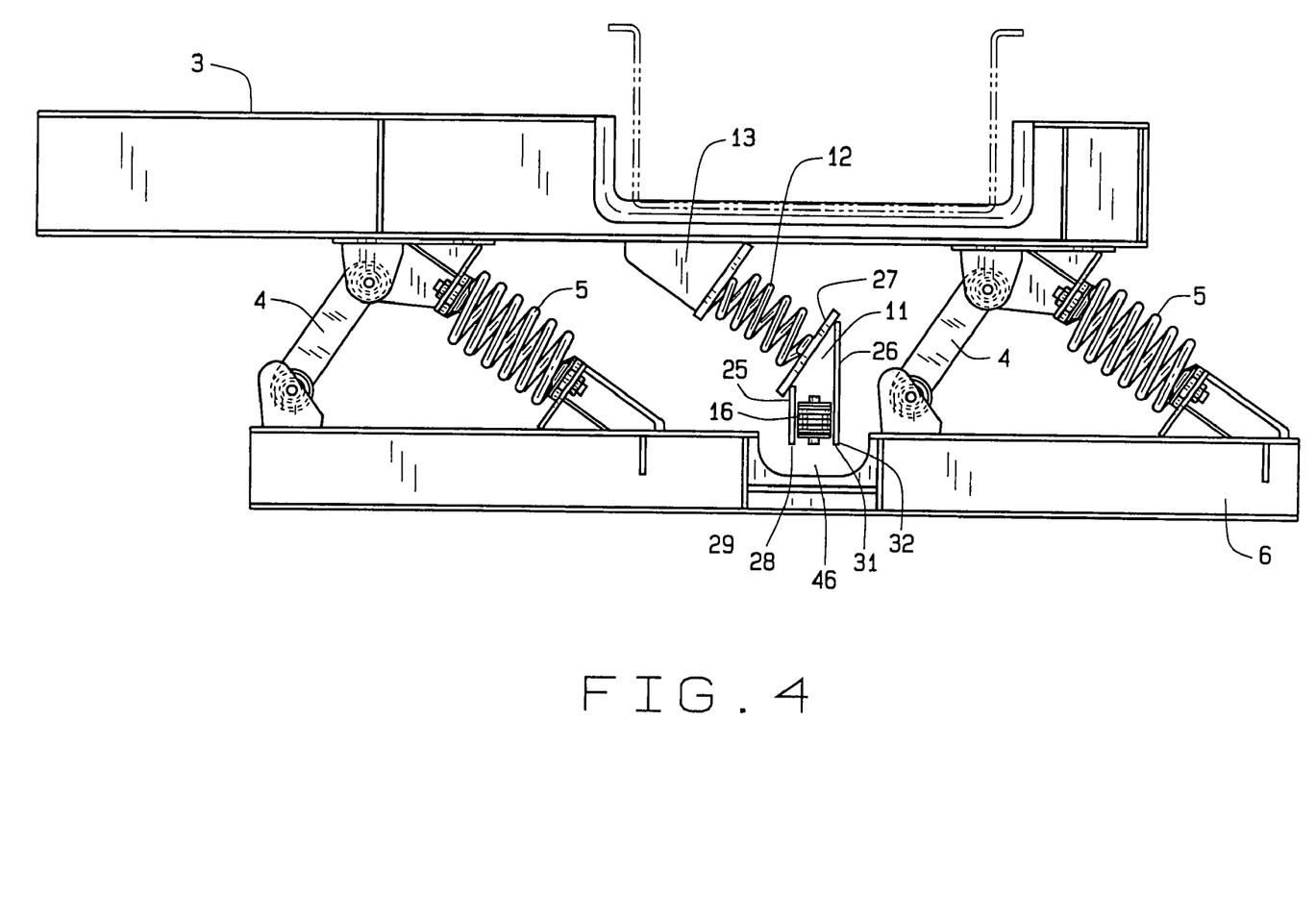
FIG. 4 illustrates a side view centered upon the second bracket of the second trough of the yoke between conveyors.

Within the chassis 6 of the second trough 3, FIG. 4 reveals more of the slave drive spring bracket 11. The slave spring 12 connects with the spring plate 27 upon two other plates: the fore plate 25 and the aft plate 26. The fore plate 25 has a generally rectangular shape [here shown on edge] joined to the spring plate 27. Opposite the joint to the spring plate 27, the fore plate 25 has a tapered end 28 with a hole 29 to admit a pin 16. Opposite the fore plate 25, the aft plate 26 has a greater length than the fore plate 25 though the fore plate 25 and the aft plate 26 are mutually parallel and spaced apart. Similar to the fore plate 25, the aft plate 26 has a tapered end 31 with a hole 32 to admit a pin 16 opposite the joint with the spring plate 27. Between the fore plate 25 and the aft plate 26, the slave drive spring bracket 11 has a second pin 16 connected to the yoke 14. A cutout 46 in the opposite side of the chassis 6 admits the yoke 14 beneath the second trough 3.

Figure 5:
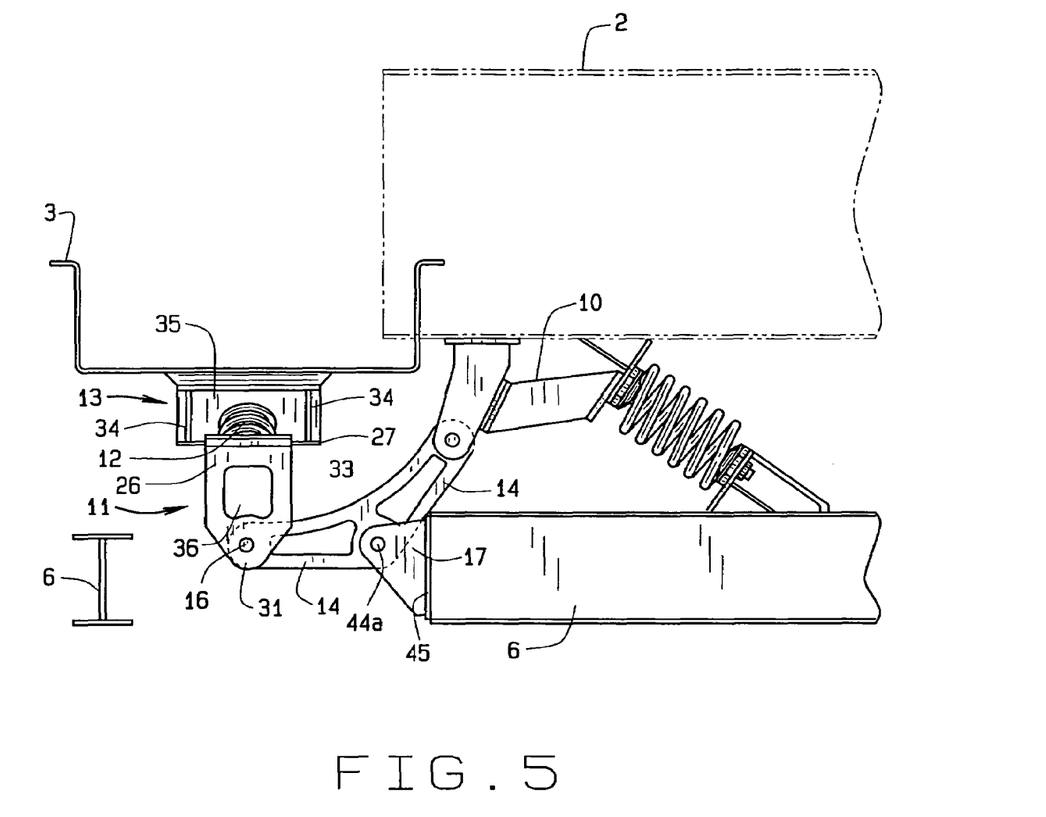
FIG. 5 describes a sectional view in the plane of the yoke coplanar with the longitudinal axis of the first trough of the yoke between conveyors.

Moving to the end of the second trough 3 and viewing down the length of the second trough 3, FIG. 5 shows the yoke 14 installed to transmit motion from the first trough 2 to the second trough 3. Centered and beneath the first trough 2, a first bracket 10 joins the first trough 2. A reactor spring 5 abuts the first bracket 10 to assist in returning the first trough 2 to start another reciprocal movement. The first bracket 10 connects by a first pin 15 to the yoke 14. The yoke 14 has a generally triangular shape with a connection at each point of the shape, a first end 40 and opposite second end 41 with a vertex 42 between the two ends 40, 41. At the vertex 42, the yoke 14 connects to a trunnion 17 with a third pin 44a. Away from the vertex 42 and the first end 40, the yoke 14 connects to the slave drive spring bracket 11 at a pin 16. Here in FIG. 5, the aft plate 26 has a generally rectangular shape with a square end 30 and an opposite tapered end 31. The tapered end 31 of the aft plate 26 has a hole 32 to admit a second pin 16 for the connection with the yoke 14. Opposite the pin connection, the aft plate 26 joins to the spring plate 27. The spring plate 27 has a generally rectangular shape as previously described that bears the slave drive spring 12. The slave drive spring 12 connects with the second bracket 13 upon the second trough 3.

Figure 6:
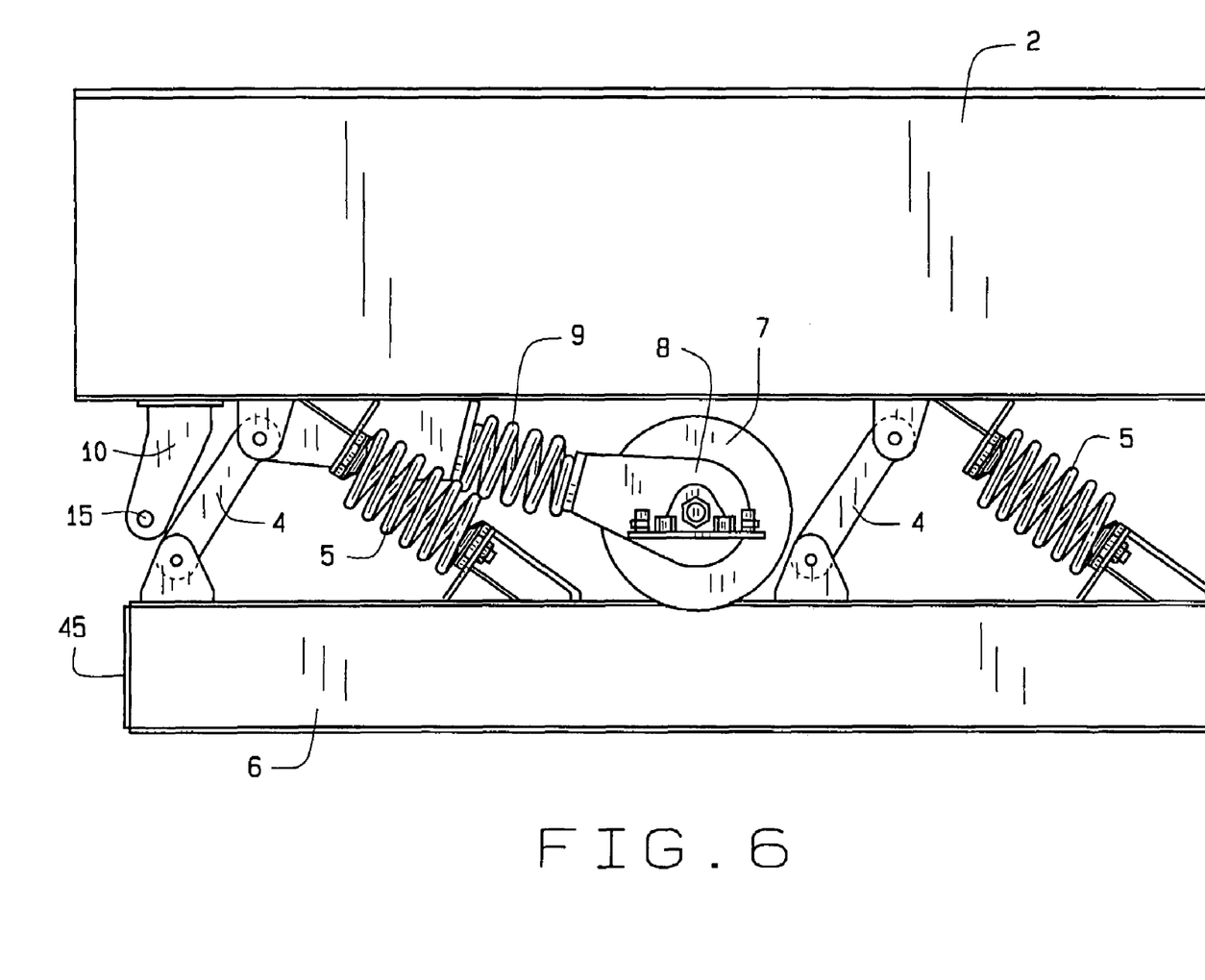
FIG. 6 shows a side view of the first trough of the yoke between conveyors.

Turning to the first trough 2, FIG. 6 shows the first trough 2 driven by the motor 7. The motor 7 attaches to the chassis 6 and the cam 8 operates from the motor 7. The cam 8 moves a linkage 9 forward, advancing the first trough 2 upon the rocker arms 4. When the cam 8 withdraws the linkage 9, the reactor springs 5 recoil and pull the first trough 2 back inducing a reciprocal motion. Centered and beneath the first trough 2, the first bracket 10 moves as the first trough 2 does. Movement of the first bracket 10 translates through the yoke 14 ninety degrees and induces movement in the second trough 3. The first trough 2 and second trough 3 move one hundred eighty degrees out of phase so that product advances through the troughs 2, 3 and does not accumulate at the angled overlap of the troughs 2, 3.

Figure 7:
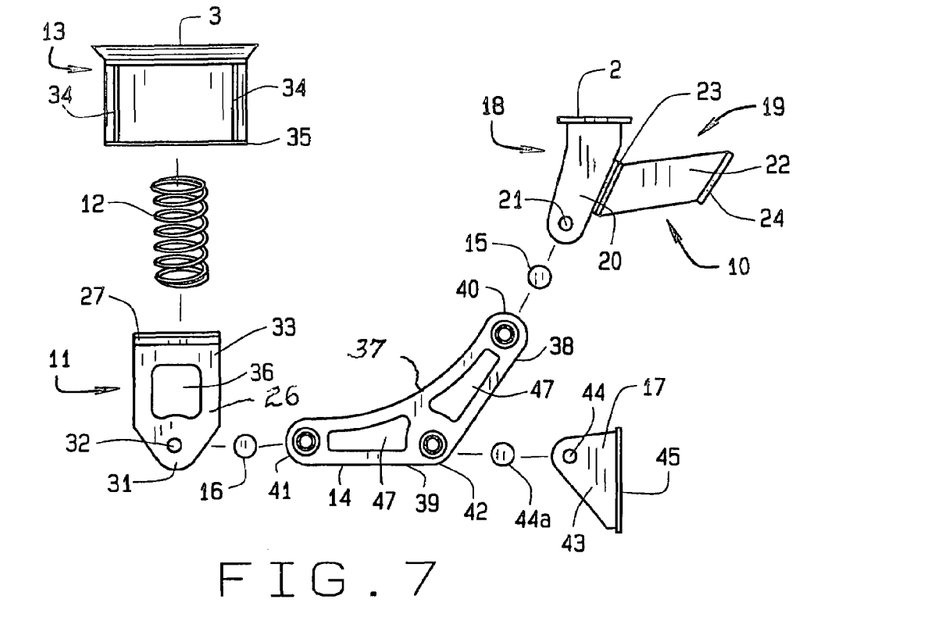
FIG. 7 shows an exploded view of the components of the yoke between conveyors; and, FIG. 8 illustrates an alternate embodiment in an exploded view of the yoke mounted upon the chassis of the first trough.

FIG. 7 describes the parts of the yoke 14 critical to the angled conveyor 1. The first bracket 10 has a first part 18 and an adjacent second part 19. The first part 18 has a pair of generally triangular plates 20 oriented parallel to the yoke 14. Spaced apart, the triangular plates 20 receive the yoke 14 between them. Holes 21 in the plates 20 admit the first pin 15 to connect the yoke 14 to the first bracket 10. The second part 19 has a plate 22 of generally parallelogram shape with a perpendicular cap 23 at one end to join the plates 20 and an opposite cap 24 to connect with a reactor spring 5 upon the first trough 2.

Next, the yoke 14 has a generally triangular shape of three sides with the hypotenuse 37 being arcuate and the other two sides 38, 39 being straight. The yoke 14 then has a first end 40 in the direction of the first trough 2, an opposite second end 41 in the direction of the second trough 3 and a vertex 42 generally midway between the first end 40 and the second end 41. At the first end 40 the first pin 15 connects with the plates 20 of the first bracket 10, upon the second end 41 the second pin 16 connects with the fore 25 and the aft 26 plates of the slave drive bracket 11, and upon the vertex 42 a third pin 44a connects with the trunnion 17. The first end 40, the second end 41, and the vertex 42 each have holes to admit a bearing that permits the yoke 14 to rotate. The first pin 15 has two threaded ends upon a bearing and connects the first bracket 10 to the first end 40 of the yoke 14. On the opposite end 42 of the yoke 14, the second pin 16 has two threaded ends upon a bearing that connect the yoke 14 to the slave drive spring 12 bracket 11. At the vertex 42, the third pin 44a also has a bearing with threaded ends connecting the yoke 14 to the trunnion 17. The pins 15, 16, 44a are parallel to one another and perpendicular to the plane of the yoke 14. In the preferred embodiment, the yoke 14 has two symmetric openings 47 between the hypotenuse 37 and the sides 38, 39.

Now the trunnion 17 has a generally triangular shaped plate 43 and a cover 45. The triangular plate 43 has a hole 44 at the vertex 42 of the plate 43 to admit the third pin 44a while the cover 45 has a generally rectangular shape centered upon and perpendicular to the plate 43 forming a T shape when viewed on end. The triangular plate 43 is parallel to the plane of the yoke 14, while the cover 45 connects to the chassis 6 of the first trough 2. To fit the yoke 14 while operating, the chassis 6 of the second trough 3 has a cutout 46 sized to admit the trunnion 17 and the yoke 14.

Opposite the first bracket 10, the slave drive spring bracket 11 near the second trough 3 has a fore plate 25, an aft plate 26, and a spring plate 27 arranged in a slanted inverted substantially U shape [best seen in FIG. 4]. Planar in shape, the fore plate 25 has a tapered end 28 with a hole 29 to admit the second pin 16 and a square opposite end 30 to join the spring plate 27. The planar spring plate 27 has a generally rectangular shape and connects to the slave drive spring 12. Then the aft plate 26 has a location parallel and spaced apart from the fore plate 25, a tapered end 31 with a hole 32 to admit the second pin 16 and an opposite square end 33 to join the spring plate 27. In the preferred embodiment, the aft plate 26 has an opening 36.

Opposite the slave drive spring bracket 11, the second bracket 13 has two generally parallel mutually spaced apart substantially triangular plates 34 joined to the second trough 3 and a cross plate 35 spanning the triangular plates 34. The slave drive spring 12 connects to the cross plate 35. Generally the bases of the triangular plates 34 join beneath the second trough 3.

Figure 8:
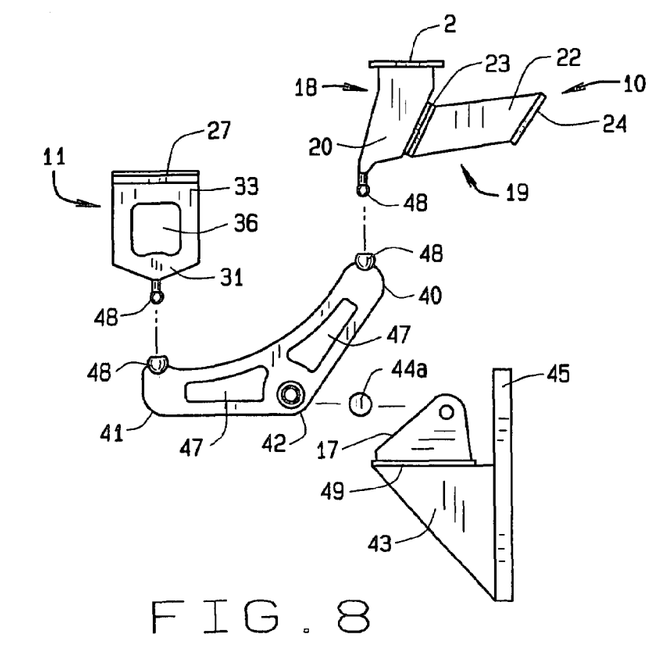

In a second embodiment FIG. 8, the present invention has the first and second pins 15, 16 exchanged for ball and socket 48 joints and a pivoting base 49 augments the trunnion 17. The ball and socket 48 joints permit the first and second troughs 2, 3 to move at an angle to the plane of the yoke 14. The third pin 44a connects to a jack plate that rests upon a pivoting base 49. The jack plate is perpendicular to the base 49. The base 49 attaches perpendicular to an edge of the triangular plate 43 of the trunnion 17. The triangular plate 43 connects to the cover 45 as in the preferred embodiment. In this embodiment, the second trough 3 can be at an angle to the first trough 2 from zero degrees [coaxial flow of product] through approximately eighty degrees. Beyond approximately eighty degrees, the preferred embodiment controls.

So in use, the motor 7 rotates the cam 8 that moves the first trough 2 left to right in a reciprocal manner. A welder assembles the pieces into the parts described above. Attached to the first trough 2, the first bracket 10 moves left to right causing the first bracket 10 to pivot upon the third pin 44a connected to the trunnion 17. The pivoting yoke 14 moves the slave drive spring bracket 11 up and down. The angle of the spring plate 27, the slave drive spring 12, and the second bracket 13 absorb the vertical component of the force from the rising and lowering slave drive spring bracket 11. The angle of the spring plate 27 creates a horizontal component of the force from the rising and lowering slave drive spring bracket 11 transmitted through the slave drive spring 12 and the second bracket 13 to the second trough 3. Thus as the first trough 2 moves left to right, the yoke 14 transforms that motion into front to back of the second trough 3 that allows product to turn an angle without an interruption in flow.

From the aforementioned description, a yoke between two conveyors at an angle has been described. The yoke between conveyors is uniquely capable of changing the direction of product flow up to and including ninety degrees between two consecutive troughs. The yoke between conveyors and its various components may be manufactured from many materials including but not limited to steel, cast iron, polymers, high density polyethylene HDPE, polypropylene PP, polyvinyl chloride PVC, nylon, ferrous and non-ferrous metals, their alloys, and composites.

We claim:

1. A conveyer system for conveying materials continuously along a series of troughs arranged angularly with respect to each other, said system incorporating at least a first trough and a second trough each reciprocating to move product continuously along a particular path through reciprocating motion, said second trough being at an angle up to 90° to said first trough, and said second trough attached to a plurality of rocker arms and cooperating reactor springs, said rocker arms and said reactor springs joined to a chassis, and said first trough having a motor upon said chassis, an eccentric cam connect to said motor, and a linkage from said cam to said first trough, wherein the improvement comprises;
   a first bracket joined beneath said first trough proximate to said second trough;
   a slave drive spring bracket join to said second trough proximate to said first trough;
   a slave drive spring connected to said slave drive spring bracket;
   a second bracket joined beneath said second trough proximate to said first trough and connected to said slave drive spring;
   a yoke having a arcuate shape, a first pin connect to said first bracket, an opposite second pin connected to said second bracket, and a centrally located trunnion connecting to said chassis of said first trough, said centrally located trunnion pivotally connecting approximately centrally to said yoke and providing for its reciprocal movement; and
   whereby, reciprocal movement of said first trough transmits through said first bracket and to said first pin, pivots said yoke upon said trunnion, moves said second pin, transmits movement to said slave drive spring bracket and said slave spring and then to said second bracket for moving said second trough approximately 180° out of phase with said first trough, thereby moving product continuously upon said second trough received from said first trough and at a substantial angle to said first trough.

2. The conveyor system of claim 1 wherein said second trough is perpendicular to said first trough.

3. The conveyor system of claim 2 further comprising:
   said first bracket having a first part and an adjacent second part, said first part having two triangular plates oriented parallel to said yoke receiving said yoke between said plates and holes in said plate to receive said first pin, said second part having a plate of parallelogram shape with an orthogonal cap at one end to join said fork and an opposite cap to connect with a reactor spring upon said first trough, said first part joining to said first trough;
   said slave drive bracket having a fore plate, an aft plate, and a spring plate arranged in a slanted inverted U shape, said fore plate having a tapered end with a hole to admit said second pin and a square opposite end to join said spring plate, said spring plate having a rectangular shape and connecting to said slave drive spring, said aft plate having a greater length than said fore plate, a location parallel and spaced apart from said fore plate, a tapered end with a hole to admit said second pin and an opposite square end to join said spring plate; and,
   said second bracket having two parallel mutually spaced apart triangular plates joined to said second trough and a cross plate spanning said triangular plates, said slave drive spring connecting to said cross plate.

4. The conveyor system of claim 3 wherein said aft plate of said slave drive bracket has an opening.

5. The conveyor system of claim 3 further comprising:
   said yoke having a triangular shape of three sides with the hypotenuse being arcuate and the other two sides being straight, a first end proximate to said first trough, an opposite second end proximate to said second trough and a vertex approximately midway between said first end and said second end, upon said first end said first pin connects with said plates of said first bracket, upon said second end said second pin connects with said fore and said aft plates of said slave drive bracket, upon said vertex a third pin connects with said trunnion;

said trunnion having a triangular shaped plate with a hole to admit said third pin and a cover rectangular in shape centered upon and perpendicular to said plate, said cover connecting to said chassis of said first trough; and, said chassis of said second trough has a cutout sized to admit said trunnion and said yoke.

6. The conveyor system of claim 4 wherein said yoke has two openings, between said first end and said vertex and said second end and said vertex.

* * * * *